United States Patent [19]

Strangefeld

[11] Patent Number: 4,777,975
[45] Date of Patent: Oct. 18, 1988

[54] SELF-CLOSING VALVE

[76] Inventor: Reiner Strangefeld, Gartemstrasse 4a 3062, Bückeburg, Fed. Rep. of Germany

[21] Appl. No.: 37,534

[22] Filed: Apr. 13, 1987

[30] Foreign Application Priority Data

Apr. 23, 1986 [DE] Fed. Rep. of Germany ....... 3613658

[51] Int. Cl.$^4$ .................... F16K 31/383; F16K 51/00
[52] U.S. Cl. .................................... 137/242; 251/44; 137/244
[58] Field of Search .................. 137/244, 242; 251/44

[56] References Cited

U.S. PATENT DOCUMENTS

| | | | |
|---|---|---|---|
| 1,571,396 | 2/1926 | Darraw | 251/44 |
| 2,329,001 | 9/1943 | Robinson | 251/44 X |
| 3,036,587 | 5/1962 | Silver | 137/244 X |
| 3,131,716 | 5/1964 | Griswold et al. | 137/242 X |
| 3,315,696 | 4/1967 | Hunter | 137/244 |

Primary Examiner—Arnold Rosenthal
Attorney, Agent, or Firm—Laubscher & Laubscher

[57] ABSTRACT

A self-closing valve is provided at a zone of a circumferential wall section of its housing that bounds a relief chamber with a stripping and holding-back arrangement which includes a saw-tooth formation constituted by a plurality of teeth and is situated at an end portion of the wall section that is close to the inlet of the valve housing. The teeth of the formation have respective substantially radially extending flanks and steep inclined flanks which are operative for stripping off contaminant particles which are entrained for joint movement by a sealing lip of a piston seal that is mounted for joint movement on a valve piston received in the wall section from the sealing lip during the movement of the valve toward its closing position, and for holding such contaminant particles back during the movement of the valve piston towards its open position. The zone provided with the formation is exposed to the action of the fluid medium flowing between the inlet and the outlet of the valve housing when the valve piston is out of its closing position, so that the contaminant particles are flushed by the flow of the fluid medium away from the zone containing the saw-tooth formation.

6 Claims, 1 Drawing Sheet

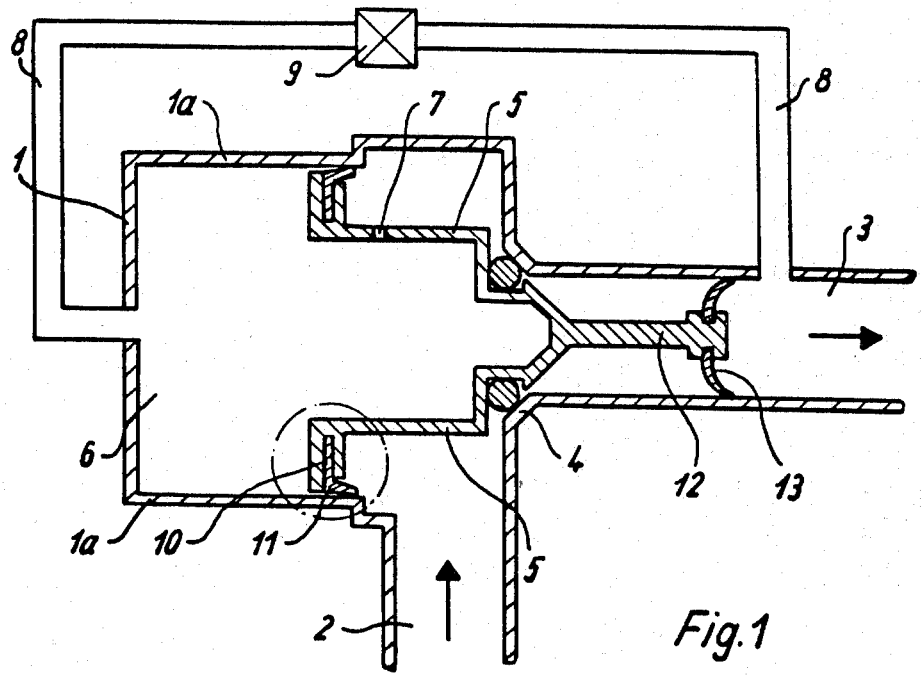
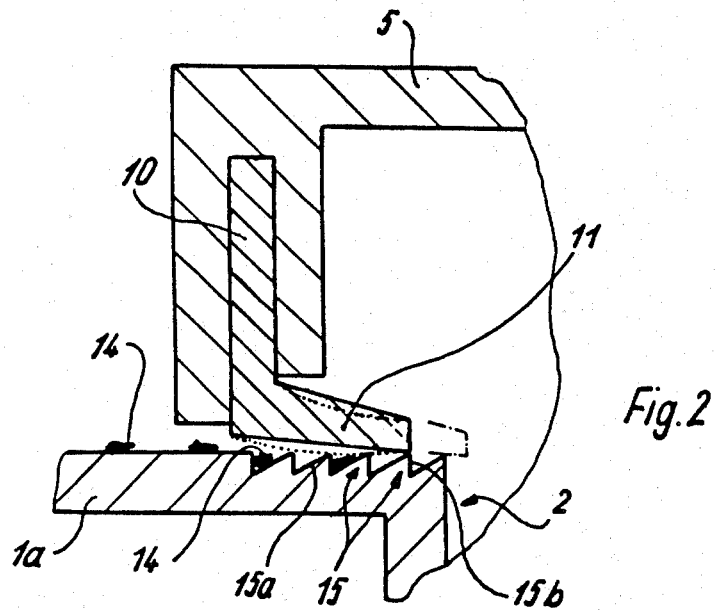
Fig. 1
Fig. 2

SELF-CLOSING VALVE

BACKGROUND OF THE INVENTION

The present invention relates to valves in general, and more particularly to a self-closing valve.

There are already known various constructions of self-closing valves of the type here under consideration. Typically, a self-closing valve of this type comprises a valve housing bounding an internal space and an inlet and an outlet communicating with the internal space and having a valve seat situated between the inlet and the outlet. A valve piston is received in the internal space for movement between a closing position in which it cooperates with the valve seat to interrupt communication between the inlet and the outlet and an open position in which it is spaced from the valve seat to establish such communication for enabling a fluid medium to flow from the inlet to the outlet. The valve piston delimits a relief chamber in the internal space. Such self-closing valves, which are being used, for instance, as flushing valves for toilets, shower fittings and the like, and which thus find a particularly useful application in the area of sanitary fittings, usually include a piston seal mounted on the valve piston for movement therewith and contacting the valve housing in a low-friction manner to separate the relief chamber from the inlet. The piston seal is often constituted by an annular collar or lip-type seal which includes a sealing lip that elastically contacts the inner surface of the circumferential wall section of the housing that bounds the relief chamber with a slight pretension and is guided on this inner surface.

Now, it cannot always be prevented with the required degree of assurance that, due to not entirely proper assembly or installation of the valve, contaminant particles, such as fine brass chips or the like, could reach or be present in the relief chamber. These contaminant particles, or at least most of them, rest on a downwardly disposed region of the inner surface of the wall which bounds the relief chamber. This is especially disadvantageous when the self-closing valve is installed in a horizontal position, since then the affected inner surface region is that of the circumferential wall section and thus such deposited contaminant particles can be transported by the relative movement of the valve piston in the housing, into the sealing region of the piston seal and cause the development of leakage currents thereat. These leakage currents then, in turn, negatively affect the flow balance of the relief chamber. This negative effect is especially detrimental in self-closing valve fittings in which an extended running time of a predetermined duration is customarily provided after the actuation impulse, in that it could result in deviations from the predetermined running time, or it could even bring about faulty functioning of the valve. However, similar problems could also be encountered even when the self-closing valve fitting is installed in a vertical position, especially when the closing direction of the piston valve extends in the downward direction. An attempt to avoid this problem by the provision of a second piston lip seal which would be effective for sealing in a direction opposite to that of the aforementioned piston seal appears to be disadvantageous. Besides the additional expense and space requirement, the second piston seal would increase the friction in a very undesirable manner. In any event, the contaminant particles would remain in the relief chamber and this could eventually result in the formation of ridges due to the frequent piston movements.

SUMMARY OF THE INVENTION

Accordingly, it is a general object of the present invention to avoid the disadvantages of the prior art.

More particularly, it is an object of the present invention to provide a self-closing valve which does not possess the drawbacks of the known valves of this type.

Still another object of the present invention is to devise a self-closing valve of the type here under consideration which would have a considerably reduced sensitivity to particulate contaminants relative to the known valve constructions.

It is yet another object of the present invention to design the above valve in such a manner as to reduce if not eliminate the deleterious effects of particulate contaminants on the operation of the valve, while keeping the frictional resistance to the movement of the valve piston as low as possible.

A concomitant object of the present invention is so to construct the valve of the above type as to be relatively simple in construction, inexpensive to manufacture, easy to use, and yet reliable in operation.

In keeping with these objects and others which will become apparent hereafter, one feature of the present invention resides in a self-closing valve comprising a valve housing bounding an internal space and an inlet and an outlet communicating with the internal space and having a valve seat situated between the inlet and the outlet. A valve piston is received in the internal space of the valve housing for movement between a closing position in which it cooperates with the valve seat to interrupt communication between the inlet and the outlet and an open position in which it is spaced from the valve seat to establish such communication for enabling a fluid medium to flow from the inlet to the outlet. The valve piston delimits a relief chamber in the internal space of the valve housing. A piston seal is mounted on the valve piston for movement therewith and contacts the valve housing in a low-friction manner to separate the relief chamber from the inlet. The self-closing valve further includes stripping and holding-back means effective between the piston seal and the housing and operative for stripping and holding back contaminant particles entrained for joint movement with the piston seal during the movement of the valve piston toward the closing position thereof.

Advantageously, the stripping and holding-back means is situated at a zone of the valve housing which is accessible to the flow of the fluid medium during the movement of the valve piston toward the open position thereof. It is especially advantageous when the piston seal includes a sealing lip and when the stripping and holding-back means includes a saw-tooth formation having a plurality of teeth which have respective tips and are arranged at a zone of the valve housing that is so situated that the sealing lip of the piston seal runs over the tips of the teeth during the movement of the valve piston between the closing and open positions thereof. In this context, it is particularly advantageous for the teeth of the saw-tooth formation to have respective substantially radially extending flanks which are so oriented as to face in the direction of movement of the valve piston toward the closing position thereof, and steep inclined flanks which face in the direction of movement of the valve piston toward the open position thereof. It is also advantageous when the zone at which the teeth of the saw-tooth formation are arranged is disposed on a circumferential wall section of the valve housing which receives the valve piston and at an end portion of such wall section that is situated close to the valve seat.

According to another advantageous aspect of the present invention, the valve housing has a circumferential wall section which receives the valve piston and has an end portion which is close to the valve seat and extends toward the inlet. Then, the stripping and holding-back means advantageously includes a sharp edge at the end portion of the wall section and the piston seal includes a sealing lip which has an end portion provided with a sealing edge, and is so arranged with respect to the wall section that the end portion of the sealing lip extends beyond the sharp edge in the closing position of the valve piston.

The stripping and holding-back means for the particulate contaminants which are entrained by the piston seal for joint movement therewith as the valve piston moves in the closing direction thereof, that is effective between the piston seal and the wall section of the valve housing that is provided with such means, assures that the contaminant particles which are possibly entrained for joint movement with the piston seal during the closing movement of the valve piston as a result of the relatively high coefficient of friction between the piston seal and such particles are initially reliably stripped off from the piston seal, but also that they cannot be entrained again by the piston seal for joint movement therewith during the movement of the valve piston in its opening direction. Thus, such contaminant particles are removed from the region at which they would pose a danger to the operation of the piston seal. There exists the possibility of letting the stripped-off and held-back contaminant particles deposit at the region of the holding-back action, that is, at the region of the stripping and holding-back means. However, what is particularly advantageous is a further feature of the present invention according to which the stripping and holding-back means is arranged at a zone of the valve housing which is accessible to the flow of the fluid medium from the inlet to the outlet of the valve housing during the opening movement of the valve piston. When this expedient is being used, the contaminant particles are flushed and carried away by the flow of the fluid medium, and thus removed from the region at which they could cause damage to the piston seal.

In addition, the arrangement according to the present invention utilizes to advantage the relatively high pressure difference between the inlet and the relief chamber which is present in the self-closing valves of this kind during the opening and the closing phase of the operation of the valve piston. Namely, these differential pressures result in a more pronounced pressing of the sealing lip of the piston seal against the associated portion of the internal surface of the valve housing and thus also against the stripping and holding-back means, so that the contaminant particles are particularly reliably stripped off from the piston seal.

BRIEF DESCRIPTION OF THE DRAWING

The present invention will be described below in more detail with reference to the accompanying drawing in which:

FIG. 1 is a somewhat diagrammatic longitudinally sectioned side elevational view of a self-closing valve employing the present invention; and FIG. 2 is an enlarged sectioned view of a detail of the self-closing valve that is encircled by a dash-dotted line in FIG. 1 and that includes a stripping and holding-back arrangement of the present invention that is effective between a valve housing wall section and a valve piston seal.

DETAILED DESCRIPTION OF THE PREFERRED EMBODIMENT

Referring now to the drawing in detail, and first to FIG. 1 thereof, it may be seen that the reference numeral 1 has been used therein to identify a housing of a self-closing valve. The housing 1 extends horizontally when the self-closing valve is installed in a horizontal position and has an inlet 2 and an outlet 3 for the flow medium, such as water when the self-closing valve is used in sanitary applications. The housing 1 is provided in the interior thereof between the inlet 2 and the outlet 3 with a valve seat 4 with which there cooperates one axial end portion of a valve piston 5, while the other end portion of the valve piston 5 which is situated oppositely to and remotely from the valve seat 4 defines a relief chamber 6 in the interior of the housing 1. The relief chamber 6 is connected, by means of respective flow channels, with the inlet 2 and with the outlet 3. In the illustrated exemplary construction, the flow channels are constituted, on the one hand, by a control nozzle opening 7 provided in the wall of the valve piston 5 and, on the other hand, by an overflow channel 8 which extends between the relief chamber 6 and the outlet 3 and in which there is interposed an auxiliary valve 9.

The valve piston 5 is sealed with respect to the relief chamber 6 by a piston seal 10 which is constructed in the illustrated construction of the self-closing valve of the present invention as a cup-shaped sealing collar including a lip 11 having a sealing edge which, as may particularly well be ascertained from FIG. 2 of the drawing, is in contact, under a slight degree of pretension, with a section of the valve housing 1 that constitutes a circumferential wall 1a, and is guided on this valve housing section 1a during the movement of the piston 5.

When the auxiliary valve 9 is closed, the valve piston 5 is held in its sealing position which is depicted in FIG. 1 of the drawing by the pressure which prevails in the relief chamber 6. When the auxiliary valve 9 is opened, which results in a pressure drop in the relief chamber 6, the valve piston 5 is displaced by the pressure prevailing at the right side of the piston seal 10 as considered in FIG. 1 into its open position, so that the flow medium, such as water, which is supplied through the inlet 2 can flow to the outlet 3 through an annular space which now exists between the valve piston 5 and the valve seat 4.

In the illustrated construction of the self-closing valve according to the invention, the valve piston 5 is provided with a shank 12 which extends into the outlet 3. A rubber-elastic lip seal 13 is mounted on the shank 12 and acts as a throttling member. The lip seal 13 extends substantially radially outwardly of the shank 12 and has a marginal portion or lip which, in the closed position of the valve piston 5, is in contact with the inner surface of that portion of the valve housing 1 which bounds the outlet 3 and is bent to the right as considered in FIG. 1 of the drawing. The water or other flow medium which flows from the inlet 2 into the outlet 3 of the valve housing 1 when the valve piston 3 is in its open position exerts a hydraulic force on the lip seal 13 which corresponds to the radial pretension of the lip seal 13 and which assures a safe closing movement of the valve piston 3.

If contaminant particles 14 rest on the inner surface of the housing 1 which bounds the relief chamber 6, they will reach the region of the piston seal 10 due to the relative movement of the valve piston 5 and may adhere to the piston seal 10 and particularly to the sealing lip 11 thereof due to the relatively high friction coefficient, particularly because such piston seals 10 often consist of a rubber-elastic material. These contaminant particles 14 are entrained by the piston seal 10 for joint movement therewith in both directions of movement. To avoid this, there is provided a stripping and holding-back arrangement for these contaminant particles 14 that are entrained for joint movement by the sealing lip 11 of the piston seal 10 during the closing movement of the valve piston, this arrangement being effective between the piston seal 10 and the wall section 1a of the valve housing 1. Such an arrangement may be constructed, in accordance with the invention, in the manner depicted in FIG. 2 of the drawing, in that the valve section 1a is provided over a zone of its interior with a saw-tooth formation 15, so that the sealing lip 11 rides over the tips of the teeth of the formation 15 during a corresponding movement of the valve piston 10. In accordance with a currently preferred implementation of the present invention, respective radial flanks 15a of the teeth of the formation 15 are so oriented as to face in the direction of the closing movement of the valve piston 5, while respective steep inclined flanks 15b of the formation 15 face in the direction of the opening movement of the valve piston 5. In this manner, it is possible for the contaminant particles 14 which are entrained for joint movement by the sealing lip 11 to move past the radial flanks 15a and not be retarded thereby during the closing movement of the valve piston 5. On the other hand, when the valve piston 5 moves in the opening direction, the contaminant particles 14 are being held back by the action of the inclined flanks 15b and can become deposited in the grooves constituted by the spaces between the teeth of the formation 15, as is illustrated in FIG. 2 of the drawing.

In accordance with an advantageous feature of the invention, the stripping and holding-back arrangements is arranged at the zone of the wall section 1a of the valve housing 1 at which the sealing lip 11 of the piston seal 10 is situated in the closed position of the valve piston 5 and which is accessible to the flow medium during the movement of the valve piston 5 toward its open position. In this manner, the contaminant particles 14 can be flushed away by the flow of the flow medium from the self-closing valve during the opening phase of the movement of the valve piston 5. It is indicated in FIG. 2 of the drawing in dotted lines how the relatively high differential pressure between the inlet 2 and the relief chamber 6 press the sealing lip 11 of the piston seal 10 against the respective zone of the wall section 1a of the valve housing 1 to an increased extent during the opening and closing phases of the movement of the valve piston 2 and thus press the sealing lip 11 against the teeth of the formation 15, so that the contaminant particles 14 can be particularly reliably stripped off by the saw-tooth formation 15 from the sealing lip 11 of the piston seal 10.

The aforementioned possibility of flushing the contaminant particles 14 by the action of the flow medium from the saw-tooth formation 15 is assured in each case when, as provided by the present invention, the saw-tooth formation 15 is disposed at the end portion of the wall section 1a which is close to the valve seat 4. However, there also exists the possibility to situate the end of the sealing lip 11 of the piston seal 10 which is provided with the sealing edge in such a manner with respect to the saw-tooth formation 15 and, in turn, to arrange the formation 15 in such a manner at the open end portion of the wall section 1a which is closer to the inlet 2 that the aforementioned end of the sealing lip 11 of the piston seal 10 which carries the sealing edge extends in the closed position of the valve piston 5 beyond the last tooth of the series of teeth constituting the formation 15. In this manner, the water or other medium flow existing in the inlet 2 can possibly easily entrain and flush the contaminant particles which adhere to the thus projecting portion of the sealing lip 11. This relative position of the parts in question in the closed position of the valve piston 5 is indicated in FIG. 2 of the drawing in dash-dotted lines with respect to the aforementioned end of the sealing lip 11.

The last-mentioned expedient may also be utilized for a special exemplary embodiment of the stripping and holding-back arrangement of the above-mentioned type. If the end portion of the wall section 1a were provided to form a sharp or acute angle with the inlet 2, but if the above-discussed saw-tooth formation 15 were omitted from this wall section 1a and if then the end of the sealing lip 11 of the piston seal 10 which is provided with the sealing edge were let to extend in the aforementioned manner beyond the thus-formed sharp edge in the closed position of the valve piston 5, in the manner illustrated in FIG. 2 of the drawing, there would already be obtained a considerable improvement in the contaminant sensitivity of such valves while simultaneously achieving a simple construction and structure, inasmuch as this sharp end edge could act, for all intents and purposes, in the same manner as a single saw tooth would, and the delimiting wall that bounds the inlet 2 and that extends to this merger region could then act in the sense of a holding-back arrangement.

While the present invention has been described and illustrated herein as embodied in a specific construction of a self-closing valve for use in controlling the flow of water in sanitary installations, it is not limited to the details of this particular construction, since various modifications and structural changes are possible and contemplated by the present invention. Thus, the scope of the present invention will be determined exclusively by the appended claims.

What is claimed is:

1. A self-closing valve comprising
    a valve housing bounding an internal space and an inlet and an outlet communicating with said internal space and having a valve seat situated between said inlet and said outlet;
    a valve piston received in said internal space for movement relative to said valve housing between a closing position in which it cooperates with said valve seat to interrupt communication between said inlet and said outlet and an open position in which it is spaced from said valve seat to establish such communication for enabling a fluid medium to flow from said inlet to said outlet, and delimiting a relief chamber in said internal space;

a piston seal mounted on said valve piston for movement therewith relative to said valve housing and contacting said valve housing in a low-friction manner to separate said relief chamber from said inlet; and stripping and holding-back means provided on said housing and operative for stripping and holding back contaminant particles entrained for joint movement with said piston seal during the relative movement of said piston seal and said housing.

2. The self-closing valve as defined in claim 1, wherein said stripping and holding-back means is situated at a zone of said valve housing which is accessible to the flow of said fluid medium during the movement of said valve piston toward said open position thereof.

3. A self-closing valve comprising
   a valve housing bounding an internal space and an inlet and an outlet communicating with said internal space and having a valve seat situated between said inlet and said outlet;
   a valve piston received in said internal space for movement between a closing position in which it cooperates with said valve seat to interrupt communication between said inlet and said outlet and an open position in which it is spaced from said valve seat to establish such communication for enabling a fluid medium to flow from said inlet to said outlet, and delimiting a relief chamber in said internal space;
   a piston seal mounted on said valve piston for movement therewith and contacting said valve housing in a low-friction manner to separate said relief chamber from said inlet, said piston seal including a sealing lip; and
   stripping and holding-back means effective between the piston seal and said housing and operative for stripping and holding back contaminant particles entrained for joint movement with said piston seal during the movement of said valve piston toward said closing position thereof, said stripping and holding-back means including a saw tooth formation having a plurality of teeth which have respective tips and are arranged at a zone of said valve housing that is so situated that said sealing lip of said piston seal runs over said tips of said teeth during the movement of said piston between said closing and open positions thereof.

4. The self-closing valve as defined in claim 3, wherein said teeth of said saw-tooth formation have respective substantially radially extending flanks which are so oriented as to face in the direction of movement of said valve piston toward said closing position thereof, and steep inclined flanks which face in the direction of movement of said valve piston toward said open position thereof.

5. The self-closing valve as defined in claim 3, wherein said zone at which said teeth of said saw-tooth formation are arranged is disposed on a circumferential wall section of said valve housing which receives said valve piston and at an end portion of such wall section that is situated close to said valve seat.

6. A self-closing valve comprising
   a valve housing bounding an internal space and an inlet and an outlet communicating with said internal space and having a valve seat situated between said inlet and said outlet;
   a valve piston received in said internal space for movement between a closing position in which it cooperates with said valve seat to interrupt communication between said inlet and said outlet and an open position in which it is spaced from said valve seat to establish such communication for enabling a fluid medium to flow from said inlet to said outlet, and delimiting a relief chamber in said internal space;
   a piston seal mounted on said valve piston for movement therewith and contacting said valve housing in a low-friction manner to separate said relief chamber from said inlet; and
   stripping and holding-back means effective between the piston seal and said housing and operative for stripping and holding back contaminant particles entrained for joint movement with said piston seal during the movement of said valve piston toward said closing position thereof, said housing having a circumferential wall section which receives said valve piston and having an end portion which is close to said valve seat and extends toward said inlet, said stripping and holding-back means including a sharp edge at said end portion of said wall section, said piston seal including a sealing lip which has an end portion provided with a sealing edge, and is arranged with respect to said wall section so that said end portion of said sealing lip extends beyond said sharp edge in said closing position of said valve piston.

* * * * *

UNITED STATES PATENT AND TRADEMARK OFFICE
CERTIFICATE OF CORRECTION

PATENT NO. : 4,777,975
DATED : October 18, 1988
INVENTOR(S) : Reiner Strangfeld

It is certified that error appears in the above-identified patent and that said Letters Patent is hereby corrected as shown below:

On the title page, Item [19], "Strangefeld" should read -- Strangfeld --.

Item [76], "Reiner Strangefeld" should read -- Reiner Strangfeld --.

On the title page, insert -- [73] Assigne: Dal - Georg Rost & Sohne GmbH & Co. Kommanditgesellschaft, Porta Westfalica Federal Republic of Germany --.

Signed and Sealed this

First Day of August, 1989

Attest:

DONALD J. QUIGG

Attesting Officer

Commissioner of Patents and Trademarks